United States Patent
Chu et al.

(10) Patent No.: US 6,909,807 B2
(45) Date of Patent: Jun. 21, 2005

(54) COMPRESSION AND SYNTHESIS OF TWO DIMENSIONAL IMAGES

(75) Inventors: Michael H. Chu, Santa Clara, CA (US); Radek Grzeszczuk, Mountain View, CA (US); Jean-Yves Bouguet, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 09/896,371

(22) Filed: Jun. 28, 2001

(65) Prior Publication Data

US 2003/0026486 A1 Feb. 6, 2003

(51) Int. Cl.$^7$ ................................................ G06K 9/36
(52) U.S. Cl. ..................................................... 382/232
(58) Field of Search ........................ 382/232, 234–236, 382/239–240, 247–248, 250–251; 708/203, 400; 375/240.01; 345/418, 419; 348/384.1

(56) References Cited

U.S. PATENT DOCUMENTS 5,455,874 A * 10/1995 Ormsby et al. ............. 382/251
5,666,212 A * 9/1997 Gilge .......................... 382/243
5,999,656 A * 12/1999 Zandi et al. ................. 382/248
6,160,919 A * 12/2000 Hale ........................... 382/250
6,573,890 B1 * 6/2003 Lengyel ...................... 345/419

* cited by examiner

Primary Examiner—Jose L. Couso
(74) Attorney, Agent, or Firm—Blakely, Sokoloff, Taylor & Zafman LLP (57) ABSTRACT

Embodiments of the present invention provide for compressing an image matrix by partitioning the image into overlapping sub-blocks, weighting each sub-block, and performing a decomposition of the weighted sub-blocks into a weighted sum of vector outer products, such as a singular value decomposition. Compression is provided by representing the image matrix by a subset of the scalar weights and associated vectors used in the decomposition. Embodiments of the present invention provide for synthesizing an image matrix by performing weighted sums of vector outer products based upon the subsets of scalar weights and associated vectors obtained during compression to provide synthesized sub-blocks, and overlaying and summing the synthesized sub-blocks to provide the synthesized image matrix.

32 Claims, 5 Drawing Sheets

COMPRESSION AND SYNTHESIS OF TWO DIMENSIONAL IMAGES

FIELD

Embodiments of the present invention relate to image processing, and more particularly, to image compression and synthesis.

BACKGROUND

Figure 1:
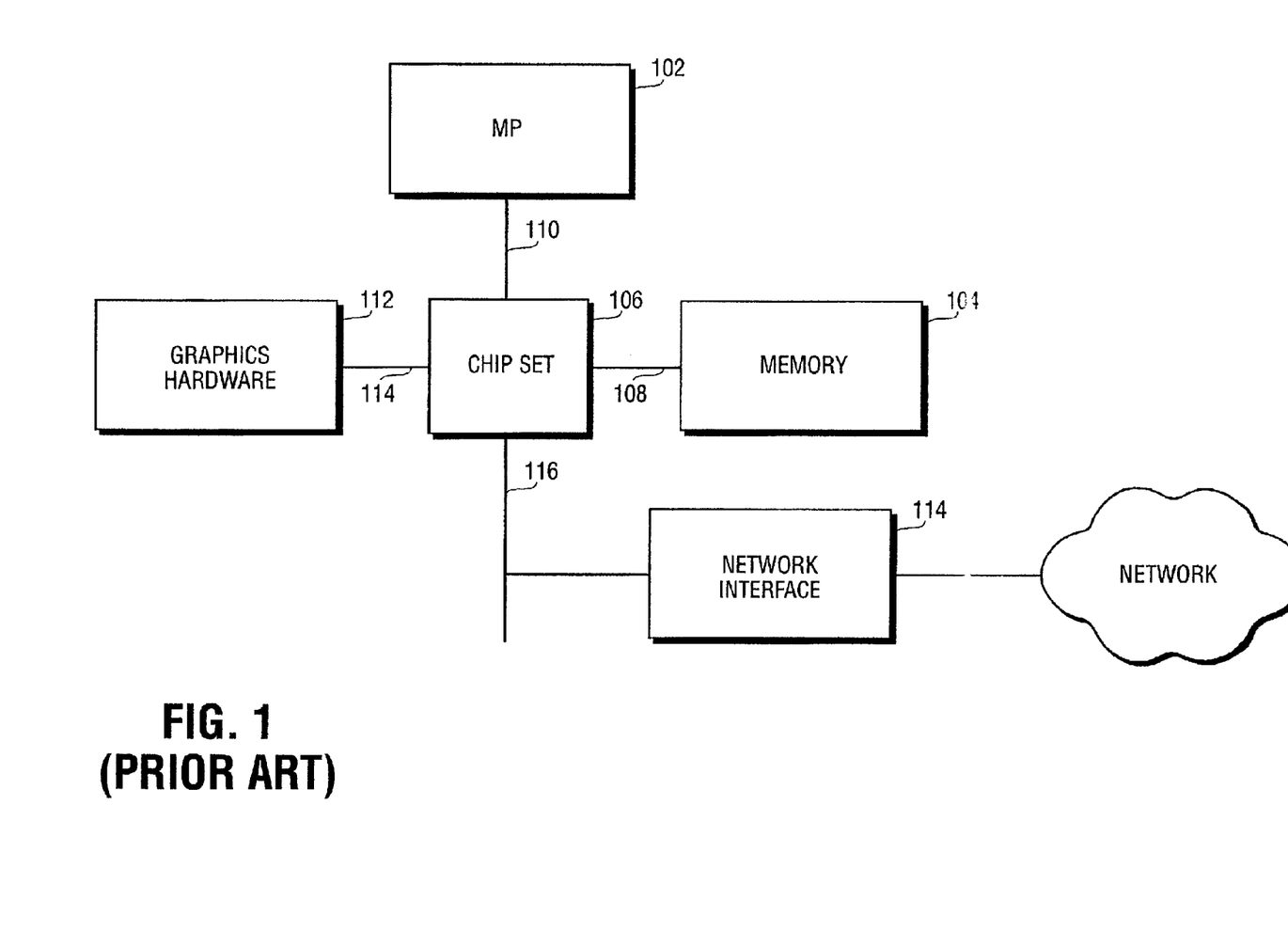
FIG. 1 is a high-level abstraction of a computer system

Digital communications is an important feature of personal computers. Data traffic carried by a digital communication system often includes image data, so that image rendering is an important task carried out by a computer system. FIG. 1 is a high level depiction of a portion of a computer system, where microprocessor 102 performs various computational tasks under control of one or more programs stored in memory 104. Memory traffic is handled by chipset 106, which includes a memory controller connected to memory bus 108. Microprocessor 102 communicates with chipset 106 via front side bus 110. Chipset 106 may also include a functional unit for communicating with graphics hardware 112 via graphics port 114.

Chipset 106 also allows microprocessor 102 to communicate with other peripheral components, such as network interface 114 via system bus 116. Network interface 114 allows the computer system to communicate with other nodes on a network, such as servers, gateways, etc., for receiving various forms of data traffic, such as image data. Alternatively, a modem (not shown) may be connected to system bus 116, allowing communication to the public switched telephone system, whereby communication may be made to other networks, including the Internet.

FIG. 1 is meant to serve only has a high level description of only one embodiment of a computer system. Other embodiments may have graphics hardware connected to system bus 116, or may have graphics hardware embedded in microprocessor 102.

Image data is very bandwidth intensive, and often is compressed (encoded) before sending it to another node on a network. For example, JPEG (Joint Photographic Experts Group) provides standards, such as ITU-TT.81, for encoding and decoding images. A compressed image received by network interface 114 is eventually uncompressed (decompressed, decoded, synthesized, or reconstructed) by either microprocessor 102 or graphics hardware 114, or perhaps another graphics accelerator in the computer system.

Graphics hardware 112 may be dedicated for quickly rendering image data to a monitor (not shown). To support the fast rendering of images, graphics hardware 112 may be designed to support various forms of vector processing in a very efficient manner. For example, multiplication of a one dimensional vector by a scalar may be performed very quickly for some high performance graphics hardware. It is desirable to provide a compression and synthesis scheme that provides a good compression ratio and for which image synthesis takes advantage of vector processing.

DESCRIPTION OF EMBODIMENTS

A two dimensional image may be represented as a matrix M, not necessarily square, in which the image pixel values are the matrix elements $M(i,j)$, where i is the row index and j is the column index. There may be separate matrices for each color component of an image, such as the red, green, and blue color components. The problem at hand is to compress the image M, that is, to represent the image by some set of bits fewer in number than that needed for exact representation, and then to synthesize the image to obtain an image $\hat{M}$, where a goal may be for $\hat{M}$ to be perceived by an observer to be a close approximation to the original image M.

For simplicity of discussion, the embodiments of the present invention will be described for a single color component of an image. The compression and synthesis algorithms described herein may be applied to each color component of the image separately, so that M is an array of pixels for a particular color component.

Embodiments of the present invention divide an image M into sub-blocks in order to perform compression. Compression is performed on each sub-block. However, the sub-blocks are overlapping. A weight matrix is applied to each sub-block, and the weighted sub-blocks are represented by a weighted sum of vector outer products. The scalar weights and vectors used in the representation provide the parameters for compression of the image. The scalar weights and vectors are either stored, or communicated over a channel, whereupon synthesis of the approximate image $\hat{M}$ makes use of forming weighted vector outer products, and taking appropriate sums of these outer products.

Figure 2:
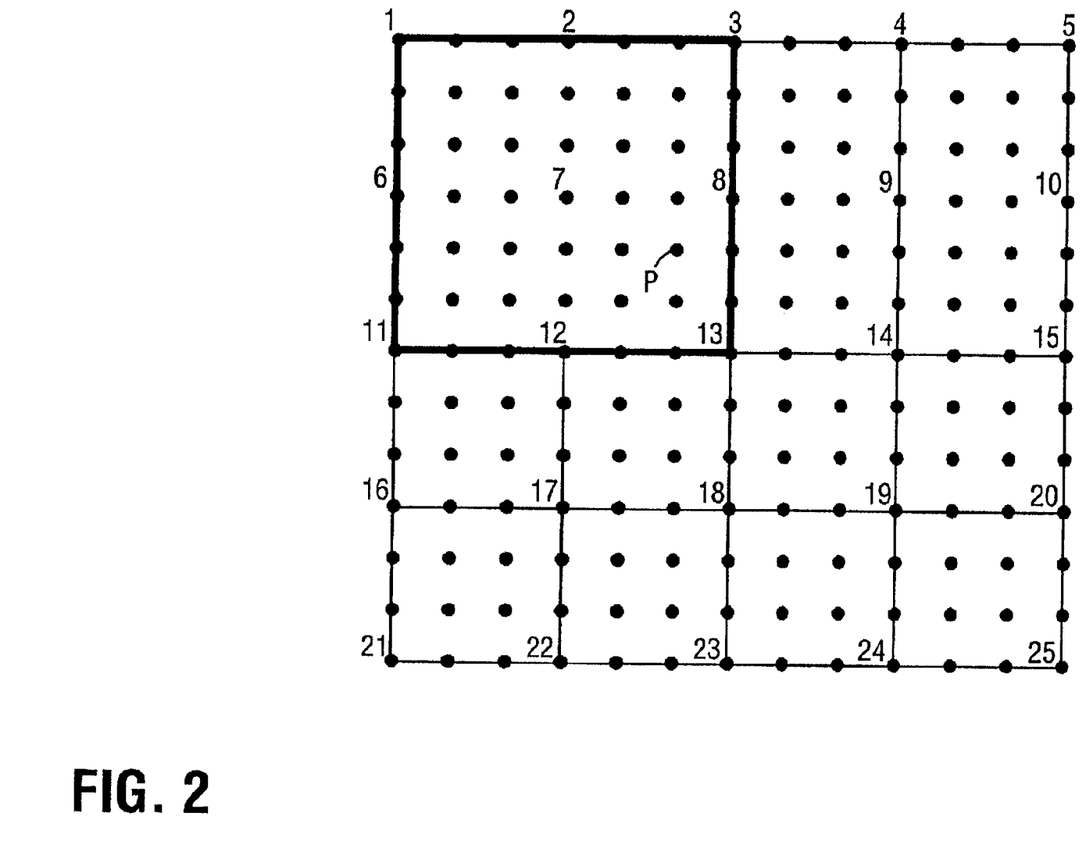
FIG. 2 is a simplified example of image matrix partitioning according to an embodiment of the present invention.

Before describing the compression method in a more general and detailed manner, it is pedagogically useful to first provide a simplified example of how an image matrix may be partitioned into sub-blocks. In FIG. 2, pixel positions in an image M are indicated by points, where a set of points have been designated as vertices with index labels i=1, 2 . . . 25. Let $m_i$ for each i=1, 2 . . . 25 denote a sub-block of pixels uniquely associated with each vertex i, defined as follows. For each vertex i, let $(J(i), K(i))$ denote the pixel coordinates for vertex i. The sub-blocks $m_i$ are those matrix elements $M(j,k)$ for which $J(i) \leq j \leq J(i)+6$ and $K(i) \leq k \leq K(i)+6$.

For example, the boundaries of sub-block $m_i$ associated with vertex 1 are in bold, with its interior region cross-hatched. It is to be understood that the ranges for j and k do not exceed the ranges for the row and column indices, respectively, of M. For example, sub-block $m_{19}$ associated with vertex 19 consists of the pixels within the square region defined by vertices 19, 20, 24, and 25. Note that sub-block $m_{25}$ consists of only vertex 25.

Sub-block $m_2$ associated with vertex 2 is cross-hatched in a different direction from that of sub-block $m_1$. Note that these two sub-blocks overlap. In the particular embodiment of FIG. 2, at most only six sub-blocks have a non-zero intersection. For example, the intersection of sub-blocks $m_1$, $m_2$, $m_3$, $m_6$, $m_7$, $m_8$ is the solid line extending from vertex 8 to vertex 13. Fewer than six sub-blocks may have a larger intersection. For example, the intersection of sub-blocks $m_1$, $m_2$, $m_6$, $m_7$ is the set of pixel elements in the square region defined by the four vertices 7, 8, 12, and 13.

To generalize to other embodiments, a set of V vertices in a matrix M are chosen, and labeled by an index i, where i=1, ..., V. For each vertex i, a sub-block $m_i$ may be defined as consisting of those matrix elements M(j,k) for which $J(i) \leq j \leq J(i)+L_r(i)$ and $K(i) \leq k \leq K(i)+L_c(i)$, where $L_r(i)$ and $L_c(i)$ are integers such that $L_r(i)+1$ is the maximum number of vertices in the "row" direction of sub-block $m_i$ and $L_c(i)+1$ is the maximum number of vertices in the "column" direction of $m_i$. For example, in FIG. 2 we have $L_r(i)=L_c(i)=6$, $\forall i$.

Note that the example of FIG. 2 has the property that the corners of each sub-block lie at a vertex position. (For sub-blocks consisting of a line of pixel coordinates, such as for example sub-block $m_{23}$ consisting of the pixel coordinates in the line extending from vertex 23 to vertex 25, the "corners" may be considered the endpoints of the line, and for the special case of sub-block $m_{25}$, the "corners" may be considered vertex 25.) In general, however, other embodiments may not have this property where sub-blocks are aligned on vertices, so that there need not be any particular relationship between $L_r(i)$, $L_c(i)$, and the coordinates of the vertices.

A matrix A may be decomposed into a sum of weighted outer products of one-dimensional vectors, given by $$A = \sum_{i=1}^{N} \sigma_i u_i v_i',$$

where vectors $u_i$ and $v_i$ are column vectors, $v_i'$ denotes the transpose of $v_i$, and $\sigma_1$ is a scalar weight. For a real matrix A, the scalar weights may be ordered as $\sigma_1 \geq \sigma_2 \geq \ldots \geq \sigma_N$, and we assume that such an ordering is performed.

A well-known decomposition of this form is the singular value decomposition, where in this case $\sigma_i$, i=1, ..., N are the singular values. Singular value decomposition plays an important role in least squares problems. There are weighted outer product representations other than the singular value decomposition. However, for the singular value decomposition, the sets of vectors $\{u_i, i=1, \ldots, N\}$ and $\{v_i, i=1, \ldots, N\}$ are orthonormal sets, and the singular value decomposition satisfies a least squares criterion.

For an embodiment of the present invention, each sub-block $m_k$ is weighted by a weight matrix $w_k$ to form a weighted sub-block $m_k*w_k$, where $w_k$ has the same dimension as $m_k$ and * denotes element-by-element multiplication. The matrix weighting may not be uniform over the elements of any particular sub-block, nor perhaps may the weighting be uniform from sub-block to sub-block.

The weighted sub-block $m_k*w_k$ will have a weighted vector outer product sum decomposition $$m_k * w_k = \sum_{i=1}^{N(k)} \sigma_i(k) u_i(k) v_i'(k).$$

As discussed above, this decomposition may be a singular value decomposition. A compression scheme is to represent each weighted sub-block by a subset of its associated scalar weights and vectors used in its outer sum decomposition. For some sub-blocks, the subset may not be a proper subset. However, compression is obtained by choosing these subsets to be proper subsets for most weighted sub-blocks.

For example, weighted sub-block $m_k*w_k$ may be represented by the set of scalar weights $\{\sigma_i(k), i=1, \ldots, n(k)\}$, the set of vectors $\{u_i(k), i=1, \ldots, n(k)\}$, and the set of vectors $\{v_i(k), i=1, \ldots, n(k)\}$, where $n(k) \leq N(k)$. Various schemes may be used to choose n(k). For one embodiment, n(k) may be a chosen to be the lesser of N(k) or some value C independent of k. For another embodiment, n(k) may be a function of the size of $m_k$. For another embodiment, n(k) may be chosen to be the smallest integer i such that $\sigma_{i+1}(k) < C$, where it is assumed that $\sigma_1(k) \geq \sigma_2(k) \geq \ldots \geq \sigma_{N(k)}(k)$ and C is independent of k, and if there is no such smallest interger, then n(k)=N(k). Clearly, there are many schemes for choosing n(k).

As a result, regardless of the particular method for choosing the subsets of scalar weights and associated vectors, the original matrix $\hat{M}$ is compressed into the family of sets of scalar weights $$\{\{\sigma_i(k), i=1, \ldots, n(k)\}, k=1, \ldots, V\},$$

the family of sets of vectors $$\{\{u_i(k), i=1, \ldots, n(k)\}, k=1, \ldots, V\},$$

and the family of sets of vectors $$\{\{v_i(k), i=1, \ldots, n(k)\}, k=1, \ldots, V\}.$$

It should be noted that solving for a singular value decomposition is a non-linear problem, and in practice the singular values and associated vectors are computed to a some desired level of accuracy. Furthermore, after computation, the singular values and associated vectors may be quantized to some desired level of quantization for purposes of storage or digital communication. Therefore, it is to be understood in these letters patent, and in the claims herein, that reference to singular values and their associated vectors is to be interpreted to mean the singular values and associated vectors as represented in the finite arithmetic of the computer system or communication system over which the values are communicated. Similar comments apply to decompositions other than singular value decomposition, so that reference to scalar weights is to be interpreted to mean the scalar weights as represented in the finite arithmetic of the appropriate system.

Figure 3:
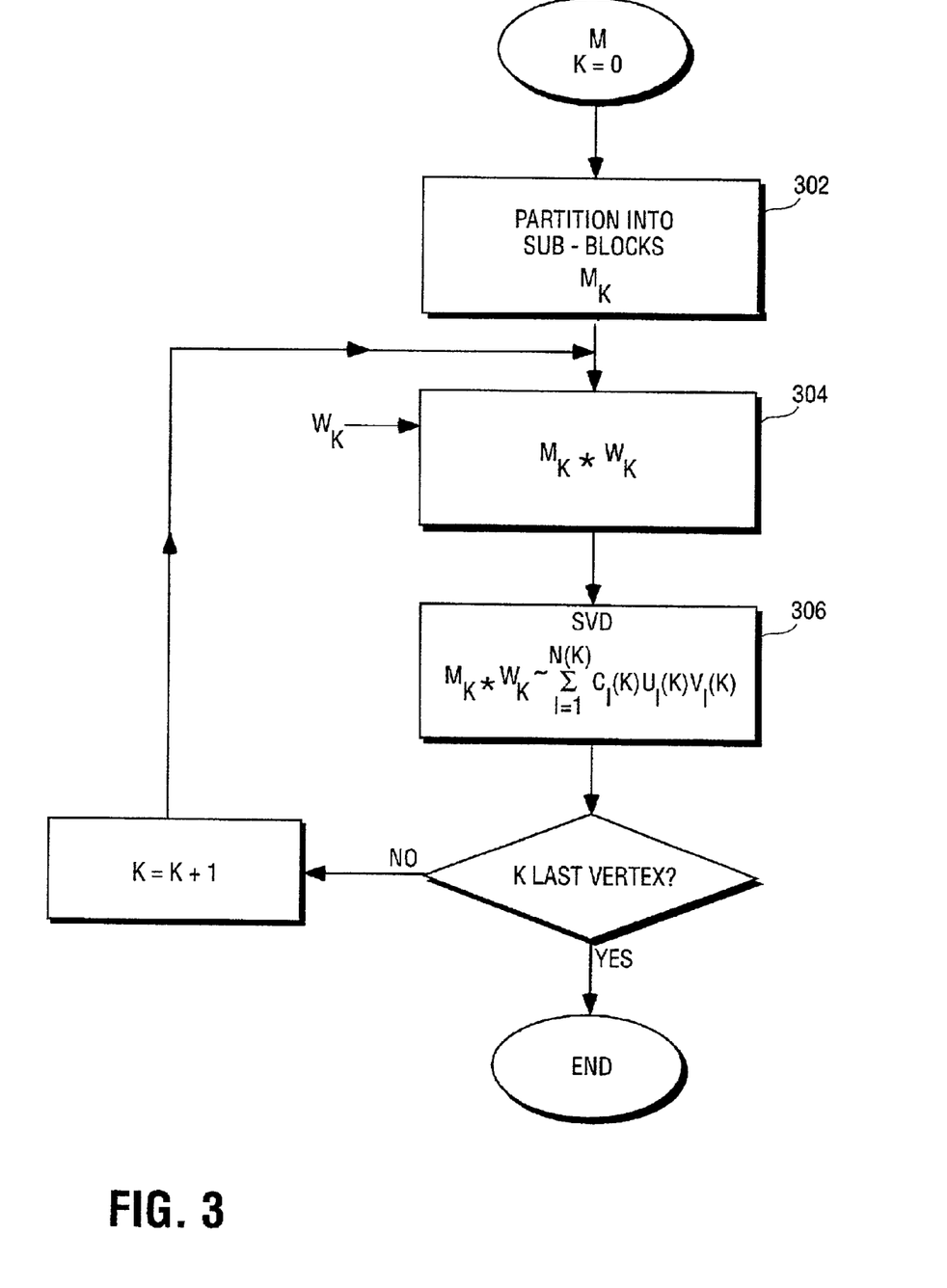
FIG. 3 is a flow diagram for image compression according to an embodiment of the present invention.

A flow diagram for image compression according to an embodiment of the present invention is illustrated in FIG. 3. Starting with an image matrix M, in block 302 the image matrix M is partitioned into sub-blocks $m_k$. In block 304, each sub-block $m_k$ is weighed by a weight matrix $w_k$. In step 306, a singular value decomposition is performed, or if performed iteratively, a partial singular value decomposition is performed, where only n(k) singular values and associated vectors are retained for storage or communication. These singular values and associated vectors represent the compressed image. These values may be further quantized and perhaps encoded before storage or transmission over a communication channel.

Because the sub-blocks overlap, a particular image element will be in more than one sub-block and will be multiplied by different weight matrix elements during different iterations of the flow diagram of FIG. 3. For example, in FIG. 2 consider the pixel element labeled p. Its pixel coordinates are (5,6). It will be multiplied, during different iterations, by the weight matrix elements $w_1(5,6)$, $w_2(5,3)$, $w_6(2,6)$, and $w_7(2,3)$. Consequently, one may choose these weight elements such they add up to unity. More generally stated, embodiment weight matrices may be chosen such that for any image pixel element p, the sum of the different weight elements multiplying p during compression are chosen to add up to a predetermined value, which without loss of generality may be chosen to be unity.

An embodiment image synthesis method may be described as follows. The scalar weights $\sigma_i(k)$, i=1, ..., n(k), the set {u_i(k), i=1, ..., n(k)}, and the set {v_i(k), i=1, ..., n(k)} will be given by the compression algorithm for each index k where the index k will range over the vertices in the partitioning of the original image matrix M, or at least that portion of the original image matrix chosen for compression, storage, or communication. For each such k, form synthesized sub-block $\hat{m}_k$ as follows:

$$\hat{m}_k = \sum_{i=1}^{n(k)} \sigma_i(k) u_i(k) v'_i(k).$$

The synthesized image $\hat{M}$ is obtained by overlaying the sub-blocks $\hat{m}_k$ in the same relative positions as the sub-blocks $m_k$ in the original image M, and numerically adding elements where there is overlap.

Figure 4:
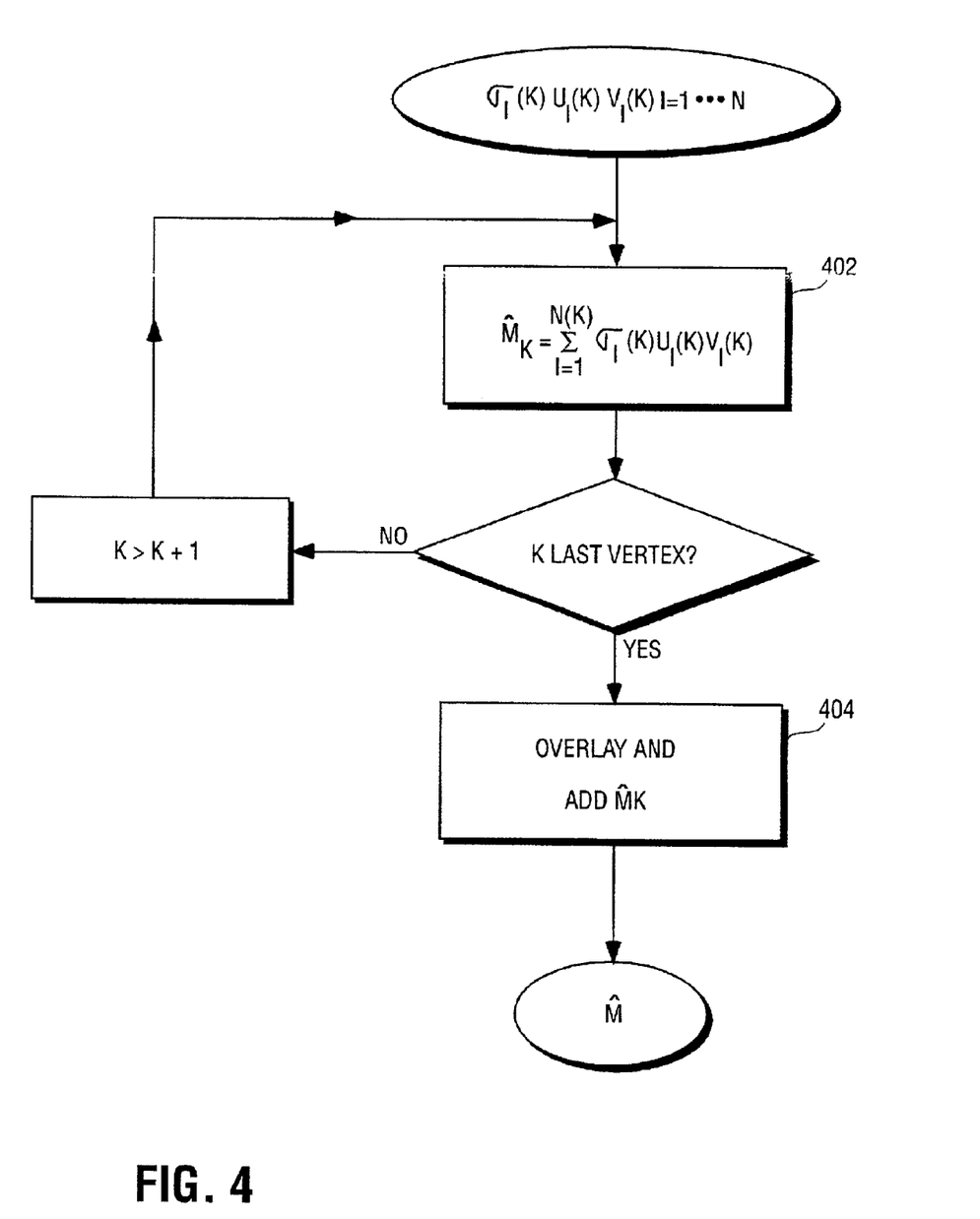
FIG. 4 is a flow diagram for image synthesis according to an embodiment of the present invention.

The above method is illustrated in the flow diagram of FIG. 4. In block 402, the weighted vector outer product is formed for a set of scalar weights and associated vectors to provide the synthesized sub-block $\hat{m}_k$. After all synthesized sub-blocks have been accounted for, in step 404 the synthesized sub-blocks are overlaid and added to provide the synthesized image matrix $\hat{M}$.

Figure 5:
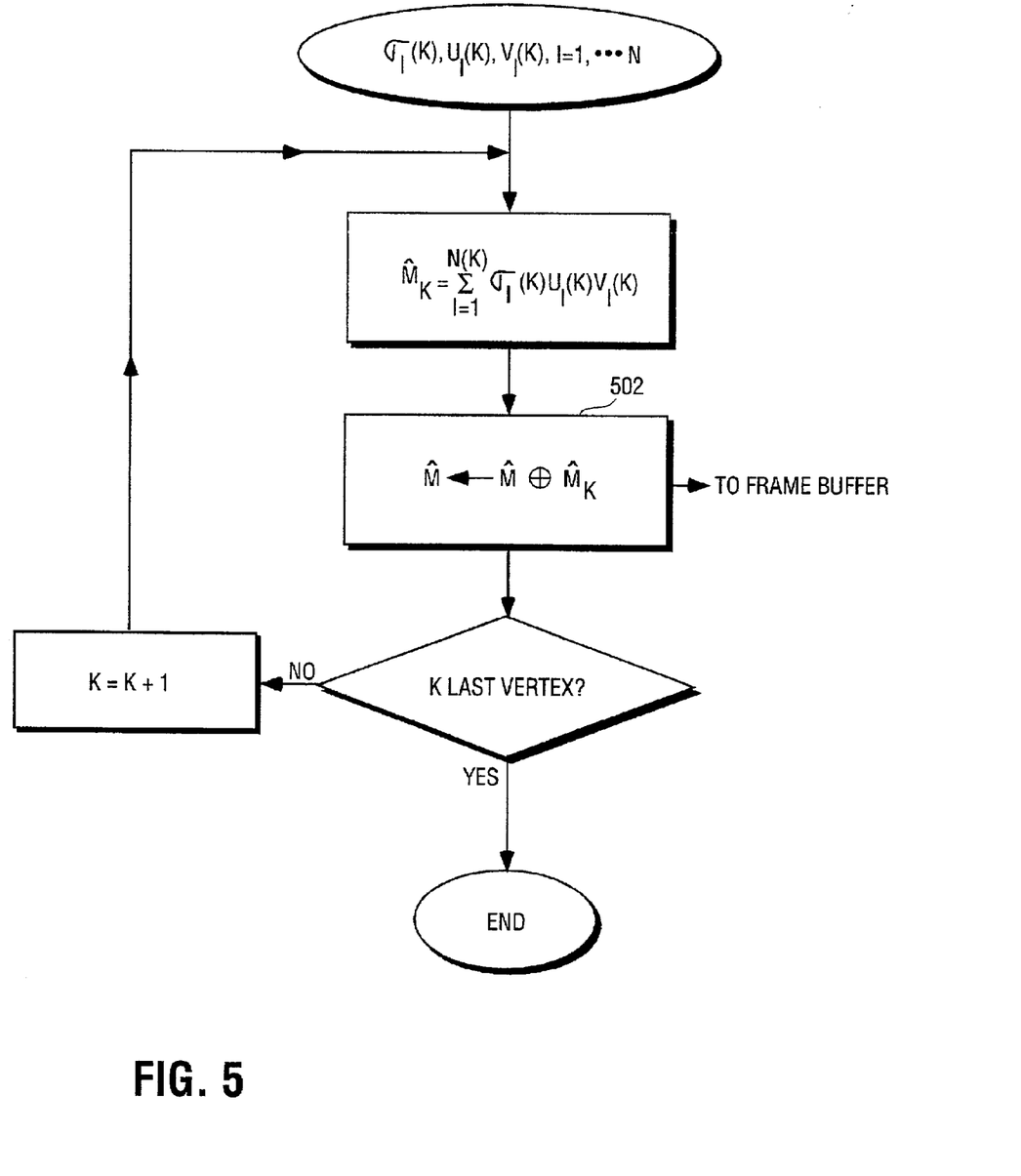
FIG. 5 is a flow diagram for image synthesis according to another embodiment of the present invention.

In other embodiments, the operations performed in block 404 may be interleaved with operations in block 402 to provide sub-blocks of $\hat{M}$ in a pipelined fashion, where these sub-blocks need not be of the same dimension as the sub-blocks $\hat{m}_k$ An example is provided by FIG. 5. In block 502, the notation $\oplus$ in the expression $\hat{M} \oplus \hat{m}_k$ indicates that elements of $m_k$ are added to those elements in the matrix $\hat{M}$ having the same coordinates as the elements in M associated with the sub-block $m_k$. That is, block 502 performs in iterative fashion the overlay and addition of step 404. Note that for block 502 of FIG. 5, a slight abuse of notation is made in that $\hat{M}$ denotes a running sum, and is not equal to the synthesized image matrix until all iterations have been performed.

Various sub-blocks of the synthesized image will be available at various iterations of block 502, which may be provided by graphics hardware 112 to a frame buffer (not shown in FIG. 1) when available. For example, for the simplified image example of FIG. 2, when block 502 has been performed such that the index k values have included 1, 2, 3, 6, 7, 8, 11, 12, and 13, then all pixels in the synthesized image having the same pixel coordinates as the pixels in FIG. 2 within the square having corners at vertices 7, 8, 12, and 13 have been computed and are ready for the frame buffer.

The embodiments described herein for image synthesis involve forming weighted sums of vector outer products and matrix addition. These types of operations are well suited for processors tuned for such vector operations. These processors may be employed in high performance graphics hardware cards, such as graphics hardware 112, or perhaps may be part of a general programmable processor, such as microprocessor 102 in a computer system.

Many other embodiments may be practiced without departing from the scope of the invention as claimed below. For example, various representations making use of weighted vector outer products other than the singular value decomposition may be employed for compressing an image matrix. Other embodiments may not perform sub-block weighting during compression, but may perform sub-block weighting during synthesis. For example, block 304 in FIG. 3 need not necessarily be performed, and instead, the sub-blocks $\hat{m}_k$ in blocks 402 or 502 may be weighted by the weight matrices $w_i$, so that $\hat{m}_k * w_k$ is overlaid and summed over the running index k. However, weighting during synthesis increases the computational burden placed on graphics hardware 112. Note also that the summation and overlay need not necessarily be performed in any particular order, so that the index k need not necessarily be incremented in a sequential manner.

Furthermore, the compression and synthesis embodiments claimed below need not be limited to matrices representing images. The subject matter of the claims below may be applied to any matrix, no matter how it is physically derived.

What is claimed is:

1. A computerized method to compress a matrix, the method comprising:

partitioning the matrix into a set of overlapping sub-blocks $\{m_k, k=1, \ldots, V\}$;

weighting each sub-block $m_k$ by a weight matrix $w_k$ to form a weighted sub-block $m_k * w_k$, where $w_k$ has the same dimension as $m_k$ and * denotes element-by-element multiplication, wherein $m_k * w_k$ has a decomposition $$m_k * w_k = \sum_{i=1}^{N(k)} \sigma_i(k) u_i(k) v'_i(k);$$

and representing each weighted sub-block $m_k * w_k$ by a set of scalar weights $\{\sigma_i(k), i=1, \ldots, n(k)\}$, a set of vectors $\{u_{i(k)}, i=1, \ldots, n(k)\}$, and a set of vectors $\{v_i(k), i=1, \ldots, n(k)\}$, where $n(k) \leq N(k)$.

2. The method as set forth in claim 1, wherein the matrix has elements M(i,j), i=1, ..., P; j=1, ..., Q where P and Q are the number of rows and the number of columns, respectively, of the matrix, wherein the weight matrices $w_k$, k=1 ..., V are such that for any image pixel element M(i,j), the sum of all weight elements in the set of weight matrices $w_k$, k=1, ..., V multiplying M(i,j) when weighting each sub-block $m_k$ by $w_k$ is a predetermined value.

3. The method as set forth in claim 2, wherein the predetermined value is unity.

4. The method as set forth in claim 2, wherein for each k, the decomposition $$m_k * w_k = \sum_{i=1}^{N(k)} \sigma_i(k) u_i(k) v'_i(k)$$

is the singular value decomposition of the weighted sub-block $m_k * w_k$.

5. The method as set forth in claim 4, wherein for each index k, n(k) is the smallest index i for which $\sigma_{i+1}(k) < C$, where C is a positive constant, the singular values are such that $\sigma_1(k) \geq \sigma_2(k) \geq \ldots \geq \sigma_{N(k)}(k)$, and if there is no such smallest integer, then n(k)=N(k).

6. The method as set forth in claim 1, wherein for each k, the decomposition $$m_k * w_k = \sum_{i=1}^{N(k)} \sigma_i(k) u_i(k) v'_i(k)$$

is the singular value decomposition of the weighted sub-block $m_k * w_k$.

7. The method as set forth in claim 6, wherein for each index k, n(k) is the smallest index i for which $\sigma_{i+1}(k) < C$, where C is a positive constant, the singular values are such that $\sigma_1(k) \geq \sigma_2(k) \geq \ldots \geq \sigma_{N(k)}(k)$, and if there is no such smallest integer, then $n(k)=N(k)$.

8. The method as set forth in claim 6, wherein there is at least one k for which $n(k)<N(k)$.

9. The method as set forth in claim 6, wherein $n(k)=\min\{C,N(k)\}$, where C is independent of k.

10. An article of manufacture comprising a computer readable medium, the computer readable medium comprising instructions to cause a computer system to:

partition a matrix into a set of overlapping sub-blocks $\{m_k, k=1, \ldots, V\}$;

weight each sub-block $m_k$ by a weight matrix $w_k$ to form a weighted sub-block $m_k*w_k$, where $w_k$ has the same dimension as $m_k$ and * denotes element-by-element multiplication, wherein $m_k*w_k$ has a decomposition $$m_k * w_k = \sum_{i=1}^{N(k)} \sigma_i(k) u_i(k) v_i'(k);$$

and represent each weighted sub-block $m_k*w_k$ by a set of scalar weights $\{\sigma_i(k), i=1, \ldots, n(k)\}$, a set of vectors $\{u_i(k), i=1, \ldots, n(k)\}$, and a set of vectors $\{v_i(k), i=1, \ldots, n(k)\}$, where $n(k) \leq N(k)$.

11. The method as set forth in claim 10, wherein the matrix has elements $M(i,j)$, $i=1, \ldots, P$; $j=1, \ldots, Q$ where P and Q are the number of rows and the number of columns, respectively, of the matrix, wherein the weight matrices $w_k$, $k=1, \ldots, V$ are such that for any image pixel element $M(i,j)$, the sum of all weight elements in the set of weight matrices $w_k$, $k=1, \ldots, V$ multiplying $M(i,j)$ when weighting each sub-block $m_k$ by $w_k$ is a predetermined value.

12. The method as set forth in claim 11, wherein the predetermined value is unity.

13. The method as set forth in claim 11, wherein for each k, the decomposition $$m_k * w_k = \sum_{i=1}^{N(k)} \sigma_i(k) u_i(k) v_i'(k)$$

is the singular value decomposition of the weighted sub-block $m_k*w_k$.

14. The method as set forth in claim 13, wherein for each index k, $n(k)$ is the smallest index i for which $\sigma_{i+1}(k)<C$, where C is a positive constant, the singular values are such that $\sigma_1(k) \geq \sigma_2(k) \geq \ldots \geq \sigma_{N(k)}(k)$, and if there is no such smallest integer, then $n(k)=N(k)$.

15. The article of manufacture as set forth in claim 10, wherein for each k, the decomposition $$m_k * w_k = \sum_{i=1}^{N(k)} \sigma_i(k) u_i(k) v_i'(k)$$

is the singular value decomposition of the weighted sub-block $m_k*w_k$.

16. The article of manufacture as set forth in claim 15, wherein for each index k, $n(k)$ is the smallest index i for which $\sigma_{i+1}(k)<C$, where C is a positive constant, the singular values are such that $\sigma_1(k) \geq \sigma_2(k) \geq \ldots \geq \sigma_{N(k)}(k)$, and if there is no such smallest integer, then $n(k)=N(k)$.

17. The article of manufacture as set forth in claim 15, wherein there is at least one k for which $n(k)<N(k)$.

18. The article of manufacture as set forth in claim 15, wherein $n(k)=\min\{C,N(k)\}$, where C is independent of k.

19. A computerized method to compress a matrix, the method comprising:

partitioning the matrix into a set of overlapping sub-blocks $\{m_k, k=1, \ldots, V\}$, where each $m_k$ has a decomposition $$m_k = \sum_{i=1}^{N(k)} \sigma_i(k) u_i(k) v_i'(k);$$

and representing each sub-block $m_k$ by a set of scalar weights $\{\sigma_i(k), i=1, \ldots, n(k)\}$, a set of vectors $\{u_i(k), i=1, \ldots, n(k)\}$, and a set of vectors $\{v_i(k), i=1, \ldots, n(k)\}$, where $n(k) \leq N(k)$.

20. The method as set forth in claim 19, wherein for each k, the decomposition $$m_k = \sum_{i=1}^{N(k)} \sigma_i(k) u_i(k) v_i'(k)$$

is the singular value decomposition of the sub-block $m_k$.

21. The method as set forth in claim 20, wherein for each index k, $n(k)$ is the smallest index i for which $\sigma_{i+1}(k)<C$, where C is a positive constant, the singular values are such that $\sigma_1(k) \geq \sigma_2(k) \geq \ldots \geq \sigma_{N(k)}(k)$, and if there is no such smallest integer, then $n(k)=N(k)$.

22. The method as set forth in claim 20, wherein there is at least one k for which $n(k)<N(k)$.

23. The method as set forth in claim 20, wherein $n(k)=\min\{C,N(k)\}$, where C is independent of k.

24. An article of manufacture comprising a computer readable medium, the computer readable medium comprising instructions to cause a computer system to:

partition a matrix into a set of overlapping sub-blocks $\{m_k, k=1, \ldots, V\}$, wherein $m_k$ has a decomposition $$m_{ki} = \sum_{i=1}^{N(k)} \sigma_i(k) u_i(k) v_i'(k);$$

and represent each sub-block $m_k$ by a set of scalar weights $\{\sigma_i(k), i=1, \ldots, n(k)\}$, a set of vectors $\{u_i(k), i=1, \ldots, n(k)\}$, and a set of vectors $\{v_i(k), k=1, \ldots, n(k)\}$, where $n(k)<N(k)$.

25. The article of manufacture as set forth in claim 24, wherein for each k, the decomposition $$m_k = \sum_{i=1}^{N(k)} \sigma_i(k) u_i(k) v_i'(k)$$

is the singular value decomposition of the sub-block $m_k$.

26. The article of manufacture as set forth in claim 25, wherein for each index k, $n(k)$ is the smallest index i for which $\sigma_{i+1}(k)<C$, where C is a positive constant, the singular values are such that $\sigma_1(k) \geq \sigma_2(k) \geq \ldots \geq \sigma_{N(k)}(k)$, and if there is no such smallest integer, then $n(k)=N(k)$.

27. The article of manufacture as set forth in claim 25, wherein there is at least one k for which $n(k)<N(k)$.

28. The article of manufacture as set forth in claim 25, wherein $n(k)=\min\{C,N(k)\}$, where C is independent of k.

29. A method computerized to synthesize a matrix $\hat{M}$, the method comprising:
  receiving families of sets comprising:
   a family of sets of scalar weights $\{\{\sigma_i(k), i=1, \ldots, n(k)\}, k=1, \ldots, V\}$;
   a family of sets of vectors $\{\{u_i(k), i=1, \ldots, n(k)\}, k=1, \ldots, V\}$; and
   a family of sets of vectors $\{\{v_i(k), i=1, \ldots, n(k)\}, k=1, \ldots, V\}$;
  forming weighted vector outer products and summing to provide $\hat{m}_k$, $k=1, \ldots, V$ where $$\hat{m}_k = \sum_{i=1}^{n(k)} \sigma_i(k) u_i(k) v'_i(k);$$

and overlaying $\hat{m}_k$ for $k=1, \ldots, V$ and summing to provide the synthesized matrix $\hat{M}$.

30. An article of manufacture comprising a readable computer medium, the readable computer medium comprising instructions to cause a computer system to synthesize a matrix $\hat{M}$ by
  receiving families of sets comprising:
   a family of sets of scalar weights $\{\{\sigma_i(k), i=1, \ldots, n(k)\}, k=1, \ldots, V\}$;
   a family of sets of vectors $\{\{u_i(k), i=1, \ldots, n(k)\}, k=1, \ldots, V\}$; and
   a family of sets of vectors $\{\{v_i(k), i=1, \ldots, n(k)\}, k=1, \ldots, V\}$;
  forming weighted vector outer products and summing to provide $\hat{m}_k$, $k=1, \ldots, V$ where $$\hat{m}_k = \sum_{i=1}^{n(k)} \sigma_i(k) u_i(k) v'_i(k);$$

and overlaying $\hat{m}_k$ for $k=1, \ldots, V$ and summing to provide the synthesized matrix $\hat{M}$.

31. A computerized method to synthesize a $\hat{M}$, the method comprising:
  receiving families of sets comprising:
   a family of sets of scalar weights $\{\{\sigma_i(k), i=1, \ldots, n(k), k\}, k=1, \ldots, V\}$;
   a family of sets of vectors $\{\{u_i(k), i=1, \ldots, n(k)\}, k=1, \ldots, V\}$; and
   a family of sets of vectors $\{\{v_i(k), i=1, \ldots, n(k)\}, k=1, \ldots, V\}$;
  forming weighted vector outer products and summing to provide $\hat{m}_k$, $k=1, \ldots, V$ where $$\hat{m}_k = \sum_{i=1}^{n(k)} \sigma_i(k) u_i(k) v'_i(k);$$

weighting each $\hat{m}_k$ by a weight matrix $w_k$ to form $\hat{m}_k * w_k$ where * denotes element-by-element multiplication; and
  overlaying $\hat{m}_k * w_k$ for $k=1, \ldots, V$ and summing to provide the synthesized matrix $\hat{M}$.

32. An article of manufacture comprising a computer readable medium, the computer readable medium comprising instructions to cause a computer system to synthesize a matrix $\hat{M}$ by
  receiving families of sets comprising:
   a family of sets of scalar weights $\{\{\sigma_i(k), i=1, \ldots, n(k)\}, k=1, \ldots, V\}$;
   a family of sets of vectors $\{\{u_i(k), i=1, \ldots, n(k)\}, k=1, \ldots, V\}$; and
   a family of sets of vectors $\{\{v_i(k), i=1, \ldots, n(k)\}, k=1, \ldots, V\}$;
  forming weighted vector outer products and summing to provide $\hat{m}_k$, $k=1, \ldots, V$ where $$\hat{m}_k = \sum_{i=1}^{n(k)} \sigma_i(k) u_i(k) v'_i(k);$$

weighting each $\hat{m}$ by a weight matrix $w_k$ to form $\hat{m}_k * w_k$ where * denotes element-by-element multiplication; and
  overlaying $\hat{m}_k * w_k$ for $k=1, \ldots, V$ and summing to provide the synthesized matrix $\hat{M}$.

* * * * *